United States Patent [19]
Levy

[11] 3,848,843
[45] Nov. 19, 1974

[54] FIXTURE ASSEMBLY
[75] Inventor: Leon M. Levy, Chicago, Ill.
[73] Assignee: Selfix, Inc., Chicago, Ill.
[22] Filed: Aug. 3, 1972
[21] Appl. No.: 277,664

[52] U.S. Cl.................... 248/224, 248/304, 248/496
[51] Int. Cl.............................................. A47g 1/16
[58] Field of Search ........... 248/495, 496, 477, 224, 248/205 A, 304

[56] References Cited
UNITED STATES PATENTS

| | | | |
|---|---|---|---|
| 2,750,142 | 6/1956 | McKee............................. | 248/224 X |
| 3,211,409 | 10/1965 | Zimmermann.................... | 248/224 X |
| 3,529,799 | 9/1970 | Schaefer............................ | 248/496 |
| 3,608,852 | 9/1971 | Horn.................................. | 287/14 X |
| 3,622,116 | 11/1971 | Fellows............................. | 248/224 X |
| 3,669,035 | 6/1972 | Grossman......................... | 248/224 X |

FOREIGN PATENTS OR APPLICATIONS
951,912 11/1949 France................................ 248/477

*Primary Examiner*—J. Franklin Foss
*Attorney, Agent, or Firm*—Dressler, Goldsmith, Clement & Gordon, Ltd.

[57] ABSTRACT

A fixture and support assembly for attaching a fixture to a supporting surface. The assembly includes the fixture having a first connecting member for connecting the fixture to a support, and the fixture support which is affixed to a supporting surface and has a second connecting member for connecting the support to the fixture. The connecting members are complementary in shape and engageable with each other to effect interconnection between the fixture and the support with the fixture at one of a plurality of orientations relative to the support. The complementary connecting members include interlocking elements engageable with each other to preclude relative movement between the interconnected fixture and support.

9 Claims, 6 Drawing Figures

PATENTED NOV 19 1974 3,848,843

FIXTURE ASSEMBLY

BACKGROUND OF THE INVENTION

There are in existence innumerable type fixtures which are adapted for attachment to a wall or similar supporting surface. Examples of such fixtures include hooks, tissue holders, paper towel holders, cup dispensers and various other products. A large number of these type appliances are permanently affixed to the supporting surface either by means of an adhesive or by suitable attachment mechanisms such as screws or nails. Once attached to the surface in this manner, such appliances may not be conveniently removed and reapplied to the surface.

If such an appliance is not initially affixed to the surface in the desired position or orientation, there exists some dissatisfaction with its appearance in place, or alternatively it is necessary to remove it and attempt to reaffix it. This problem not only detracts from the consumers' affection for the product, but often results in reduction in the ability to reapply it or reaffix it to the surface or destruction of the device or appliance itself.

Many such appliances are not themselves affixed directly to the surface but consist of at least two components, a support plate or bracket and the fixture supported thereon. In these structures, the support is attached to the supporting surface and is configured to receive the fixture. The support usually is configured so that when the fixture is attached thereto, it is effectively a unitary structure in which the fixture is rendered immovable relative to the support.

It would be highly desirable for those appliances which are to be permanently affixed to a surface or in which at least the support is to be permanently affixed to a surface for the support to have a configuration that would permit the desired orientation of the fixture thereon which would permit the desired orientation of the fixture relative to the supporting surface or wall.

SUMMARY OF THE INVENTION

In accordance with the present invention, there is provided an assembly of a support member adapted to be permanently or semi-permanently affixed to a wall or other supporting surface and adapted to receive and support a fixture thereon in almost any orientation while retaining the fixture generally immovable.

In general, the support plate of the present invention has two functional components, an attachment portion and a connecting member. The support plate typically is molded of a suitable plastic material and incorporates as part of the attachment portion or back surface thereof, a piece of fibrous material or wood insert such as is disclosed in Dressler U.S. Pat. No. 3,504,878. The external surface of this insert has adhesive applied thereto and is used to affix the support plate to the wall or supporting surface, although alternatively, the support member may be attached to the wall by screws or other mechanical devices.

The support plate connecting member is designed to be spaced away from the supporting surface to which the plate is affixed to allow a fixture to be supported thereon. The connecting member typically is generally universally shaped, for example, having a generally circular periphery, to enable a fixture to be mounted thereon in any desired position or orientation.

Since the universal shape of the connecting member does not, by its geometry, retain the fixture in a stationary position, suitable locking elements are provided on the support plate and on the fixture to retain the fixture in position when connected to and supported on the support plate.

In one embodiment of the present invention, a support plate is provided having a generally circular attachment portion and a connecting member in the form of a generally annular flange extending out from the front of the circular attachment portion. The rear surface of the annular flange is spaced from the rear of the support plate to provide space into which a fixture, or a portion thereof may be positioned when attached to the support plate. On the front surface of the annular flange there are provided a plurality of uniformily spaced radially extending deformations or grooves which may, conveniently, extend around the entire front surface of the annular flange. These radial grooves or serrations, define the interlocking elements of the connecting member or the annular flange.

The fixture is provided with a connecting member in the form of a generally planar surface adapted to abut against the front surface of the annular support flange. The fixture connecting member includes a retaining portion which defines a generally arcuate slot into which the upper portion of the support plate annular flange is inserted. At least one tooth is formed in the planar surface of the fixture connecting member adjacent the generally upper peripheral edge thereof. This tooth is adapted to engage with the serrations in the surface of the annular flange to keep the fixture stationary in position on the support plate when the fixture and support plate are connected together. Because of the radial configuration of the back plate serrations, the tooth or teeth on the fixture become wedged into the back plate serrations as the fixture is inserted thereon.

Numerous other advantages and features of the present invention will become readily apparent from the following detailed description of the invention and of one embodiment thereof, from the claims and from the accompanying drawings in which each and every detail shown is fully and completely disclosed as a part of this specification in which like numerals refer to like parts.

DETAILED DESCRIPTION

Figure 3:
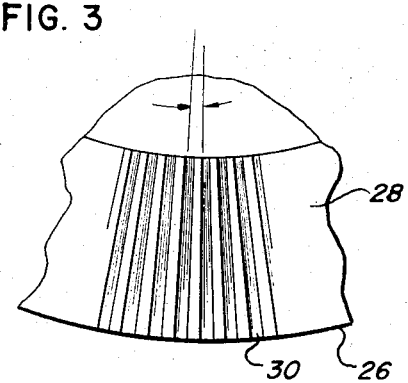
FIG. 3 is an enlarged partial back view of the support plate of FIG. 2.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The fixture assembly 10 of the present invention includes a support member or support plate 12 and a fixture 14 adapted to be supported and retained on the support plate 12.

The support plate 12 is typically molded from a suitable plastic material and includes a back or attachment portion 16 incorporating a fibrous or wood insert 18 having a suitable adhesive on the exposed surface thereof for attachment to a wall or other supporting surface 19. The support plate 12 is of a generally circular configuration and includes a forwardly extending annular wall 20 defining a central recess 22 in the surface 23 of which are provided partial apertures 24 through which mechanical attachment devices such as screws or nails may be passed for attaching the support plate to a surface as an alternative to the adhesive on the exposed back surface of the wood insert 18.

The forward end of annular wall 20 terminates in an outwardly extending annular connecting flange 26. The front surface 28 of the annular support flange 26 incorporates a plurality of radially extending deformations 30 in the form of serrations, grooves or teeth, typically extending around the entire surface thereof. The radial deformations 30 define the interlocking elements of the support plate connecting member and are adapted to retain a fixture in desired orientation when supported on the support plate 12.

Figure 5:
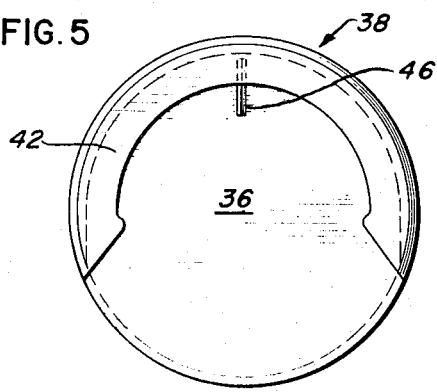
FIG. 5 is a back view of a fixture.
Figure 1:
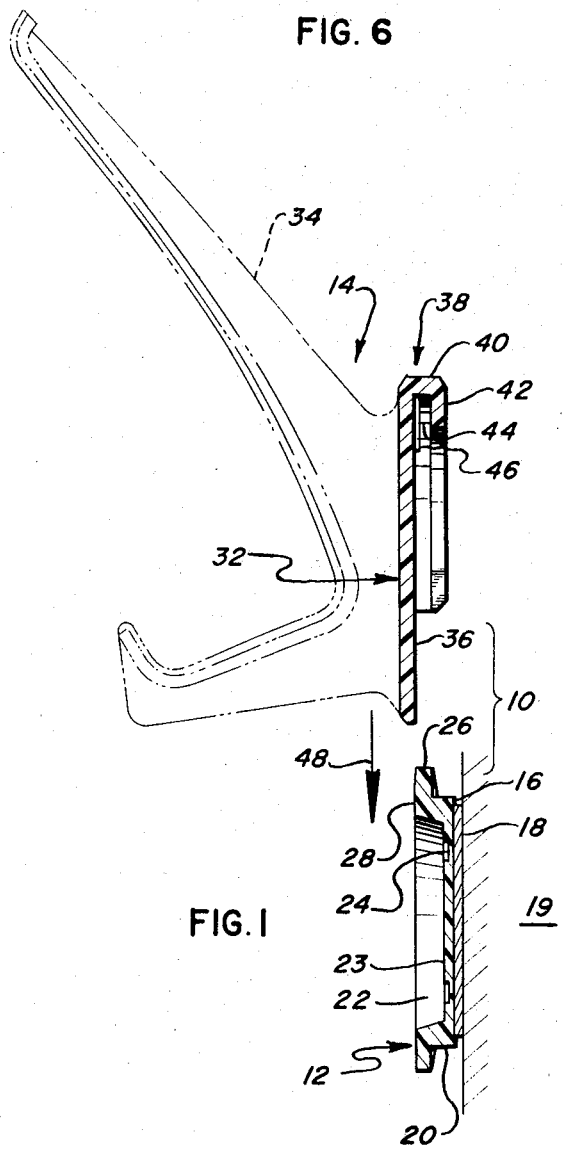
FIG. 1 is a side view, partially in section, of the two components making up the fixture assembly of the present invention.

The fixture 14 includes a connecting member 32 and a load carrying member of any desired configuration, shown in the drawing in phantom as a hook 34. The connecting member 32 of fixture 14, as seen in FIGS. 1 and 5, includes a generally planar rear surface 36 adapted to abut against the front surface 28 of the annular support flange 26, member 32 including a retaining element 38 formed integrally therewith. The retaining element 38 is generally hook-like in appearance and includes an end or lateral flange portion 40 extending generally perpendicular to the rear planar surface 36 and a lip 42 extending parallel to the rear planar surface 36 and spaced therefrom to define a generally arcuate retaining slot 44 adapted to fit over the end of the annular support flange 26 with the lip 42 disposed between the rear surface of the annular flange 26 and the surface of the supporting surface 19.

As is seen most clearly in FIG. 5, the retaining element 38 may extend along a substantial portion of the periphery of the planar surface 32 in order to adequately retain the fixture on the support plate 12. It is clear, that the retaining element 38 terminates at a position which allows the annular flange 26 to be inserted therein.

Figure 6:
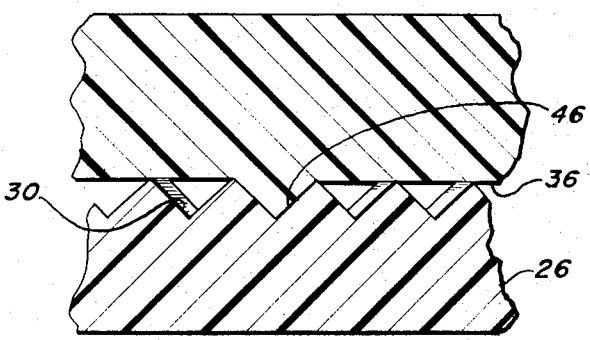
FIG. 6 is an enlarged partial sectional view showing the interconnected fixture and support plate.
Figure 4:
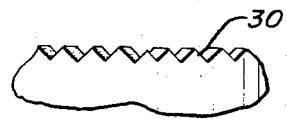
FIG. 4 is an enlarged partial end view of FIG. 3.
Figure 2:
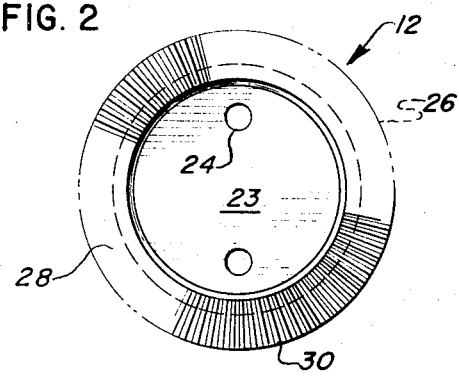
FIG. 2 is a front view of the support plate forming part of the assembly of the present invention.

A single radial deformation 46 complementary in figuration to deformations 30 formed in the surface 28 of annular flange 26 is formed on the rear planar surface 36 adjacant the upper pheripheral edge thereof and typically, midway between the termination of the retaining element 38. The deformation 46, e.g. a tooth or bead, forms part of the complementary interlocking elements and is adapted to engage the deformations 30, as seen in FIG. 6. Because the deformations 30 extend radially, as best seen in FIGS. 3 and 4, the tooth 46 becomes wedged therein as the fixture and support plate are interconnected.

Since the annular flange 26 is completely symmetrical, the position or orientation of the support plate is not determinative of the orientation of the fixture supported thereon. The fixture can be connected to and supported on the support plate in any position, after which it is moved in a direction shown by the arrow 48 in FIG. 1 until the tooth 46 engages the serrations 30 to retain the fixture in the desired orientation.

As a result, the fixture can be oriented in any desired position on the support plate allowing the support plate to be conveniently and permanently affixed to a wall or other supporting surface without concern for the desired orientation of the fixture to be supported thereon.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. A fixture and support assembly for effectively attaching a fixture to a supporting surface, said assembly comprising:

a fixture having a first connecting member for connecting said fixture to a fixture support;

a fixture support adapted to be affixed to the supporting surface and having a second connecting member for connecting said support to said fixture, said second connecting member having a configuration operative to connect said support to said fixture independently of the angular orientation at which said fixture support is affixed to the supporting surface;

said first and second connecting members being complementary in shape and engageable with each other to effect interconnection between said fixture and said support with said fixture at a selected one of a plurality of orientations relative to said support;

said complementary connecting members including interlocking elements engageable with each other, said interlocking elements having a configuration for locking said interconnected fixture and fixture support at said selected orientation to preclude relative angular movement therebetween;

one of said complementary connecting members including retaining means engageable with at least a portion of the other of said connecting members for precluding disengagement of said interlocking elements when said fixture and support are interconnected;

whereby said fixture is retained in said selected orientation relative to said support and relative angular movement between said interconnected fixture and support is precluded.

2. An assembly as claimed in claim 1, wherein said retaining means retains said connecting members in said selected one position with at least one surface of each of said connecting members being abutted together, the configuration of said retaining means and said portion engageable therewith permitting relative sliding movement therebetween for removal of said fixture from said fixture support.

3. An assembly as claimed in claim 2 wherein said interlocking elements are formed on said abutting surfaces.

4. An appliance adapted to be affixed to a supporting surface comprising: an effectively unitary assembly of a fixture and a fixture support;

said fixture support including a plastic body and an attachment member bonded to the rear of said body for affixing said support to a supporting surface;

the front of said support body defining a first connecting member in the form of a generally annular flange having a front generally planar surface;

a plurality of radially extending serrations formed in said front generally planar surface;

a fixture having a load carrying member extending out from the front thereof and a generally planar back circular in plan view;

at least a portion of which being adapted to be abutted against the front planar surface of said annular flange when said fixture and said support are interconnected;

an elongate tooth formed in said planar back and slidably engageable with at least one of the radially extending serrations in the front surface of said annular flange to preclude relative movement therebetween when said fixture and said support are interconnected;

and a retaining element extending along a portion of the periphery of said planar back to define a generally arcuate slot for receiving a portion of the circular peripheral edge of said annular flange to retain said fixture on said support and to retain said tooth in engagement with said serrations when said fixture and said support are interconnected; whereby said fixture is rigidly connected to and supported on said support in a selected position independent of the orientation of the fixture on the support surface to form said unitary assembly.

5. A fixture and support assembly for effectively attaching a fixture to a supporting surface, said assembly comprising:

a fixture having a first connecting member for connecting said fixture to a fixture support, a fixture support adapted to be affixed to the supporting surface and having a second connecting member for connecting said support to said fixture, said second connecting member having a configuration operative to connect said support to said fixture independently of the angular orientation at which said fixture support is affixed to the support surface;

said first and second connecting members being complementary in shape and engageable with each other to effect interconnection between said fixture and said support with said fixture at a selected one of a plurality of orientations relative to said support;

said complementary connecting members including interlocking elements engageable with each other to preclude relative movement between said interconnected fixture and support;

one of said complementary connecting members including retaining means engageable with at least a portion of the other of said connecting members for precluding disengagement of said interlocking elements and for retaining said connecting members in said selected one position with at least one surface of each of said connecting members being abutted together, the configuration of said retaining means and said portion engageable therewith permitting relative sliding movement therebetween for removal of said fixture from said fixture support;

said interlocking elements including a plurality of radiating first elongate deformations in one of said abutting surfaces, each of said elongate deformations being disposed at an angle to the others, and the other of said interlocking elements including a second elongate deformation formed in the other of said abutting surfaces and engageable in one of said first elongate deformations to preclude relative angular movement between said interconnected fixture and support, said retaining means being operative to prevent disengagement of said first and second deformations of said interconnected fixture and support;

whereby said fixture is retained in said selected orientation relative to said support and relative angular movement between said interconnected fixture and support is precluded.

6. A fixture support assembly for effectively attaching a fixture to a supporting surface, said assembly comprising:

a fixture having a first connecting member for connecting said fixture to a fixture support;

a fixture support adapted to be affixed to the supporting surface and having a generally circular rear attachment portion having a back adapted to be affixed to said supporting surface and a second connecting member for connecting said support to said fixture, said second connecting member having a general circular periphery and a generally planar front surface and being operative to connect said support to said fixture independently of the angular orientation at which said fixture support is affixed to the supporting surface;

said first and second connecting members being complementary in shape and engageable with each other to effect interconnection between said fixture and said support which said fixture had a selected one of a plurality of orientations relative to said support;

said complementary connecting members including interlocking elements engageable with each other to preclude relative angular movement between said interconnected fixture and support, said second connecting member incorporating one of said locking elements as a plurality of radial extending elongate deformations formed in said generally planar front surface thereof;

one of said complementary connecting members including retaining means engageable with at least a portion of the other of said connecting members for precluding disengagement of said interlocking elements;

whereby said fixtures retained in said selected orientation relative to said support in relative angular movement between interconnected fixture and support is precluded.

7. An assembly as claimed in claim 6 wherein said generally circular second connecting member has a diameter greater than the diameter of said attachment portion, the rear surface of said connecting member being spaced forwardly from the back of said connecting portion to define a recess between said rear surface and the supporting surface to which said fixture support is affixed.

8. An assembly as claimed in claim 7, wherein said first connecting member is generally circular in plan view and includes a generally planar rear surface adapted to be abutted against said generally planar front surface of said second connecting member and further including said retaining means, said retaining means being formed to fit over the periphery of said second connecting member and to extend into said recess for retaining said planar surfaces in surface to surface abutting relation.

9. An assembly as claimed in claim 8, wherein said first connecting member incorporates one of said interlocking elements as a single radial elongate deformation formed in said generally planar rear surface thereof, said single radial elongate deformation being slidably engageable with and wedged into one of said plurality of elongate deformations formed in the front surface of said second connecting member when said fixture is connected to said fixture support, whereby said interengaged elongated deformations preclude relative angular movement between said interconnected fixture and support and said retaining means preclude disengagement of said elongate deformations when said fixture is connected to said fixture support.

* * * * *